United States Patent
Dravida et al.

(10) Patent No.: US 8,169,980 B2
(45) Date of Patent: May 1, 2012

(54) METHODS AND APPARATUSES FOR INTERWORKING

(75) Inventors: Subrahmanyam Dravida, Shrewsbury, MA (US); Sanjiv Nanda, Ramona, CA (US); Manoneet Singh, Santa Clara, CA (US); Shravan K. Surineni, Marlborough, MA (US)

(73) Assignee: QUALCOMM Incorporated, San Diego, CA (US)

( * ) Notice: Subject to any disclaimer, the term of this patent is extended or adjusted under 35 U.S.C. 154(b) by 975 days.

(21) Appl. No.: 11/412,578

(22) Filed: Apr. 26, 2006

(65) Prior Publication Data

US 2007/0021066 A1  Jan. 25, 2007

Related U.S. Application Data

(60) Provisional application No. 60/698,510, filed on Jul. 11, 2005.

(51) Int. Cl.
*H04J 3/00* (2006.01)

(52) U.S. Cl. .............. 370/336; 370/395.4; 370/458; 370/468

(58) Field of Classification Search .......... 455/41.2, 455/552.1; 370/344, 347, 478
See application file for complete search history.

(56) References Cited

U.S. PATENT DOCUMENTS

| | | | | |
|---|---|---|---|---|
| 5,471,670 | A * | 11/1995 | Hess et al. | 455/437 |
| 2001/0010689 | A1* | 8/2001 | Awater et al. | 370/344 |
| 2002/0136184 | A1 | 9/2002 | Liang et al. | |
| 2003/0214961 | A1 | 11/2003 | Nevo et al. | |
| 2004/0047324 | A1* | 3/2004 | Diener | 370/338 |
| 2004/0048572 | A1 | 3/2004 | Godfrey et al. | |
| 2005/0025174 | A1* | 2/2005 | Fischer et al. | 370/445 |

FOREIGN PATENT DOCUMENTS

| | | |
|---|---|---|
| JP | 2001217853 | 8/2001 |
| JP | 2003174453 A | 6/2003 |
| JP | 2003219459 A | 7/2003 |
| JP | 2005045330 A | 2/2005 |
| JP | 2005045368 | 2/2005 |
| JP | 2006511118 | 3/2006 |
| JP | 2006521714 | 9/2006 |
| JP | 2007515099 T | 6/2007 |
| RU | 2001113741 | 6/2003 |
| WO | WO2005015751 A1 | 2/2005 |

(Continued)

OTHER PUBLICATIONS

Kamerman et al., "Coexistence between Bluetooth and IEEE 802.11 CCK Solutions to avoid mutual interference," IEEE P802.11, Jun. 30, 2000, pp. 1-7.

(Continued)

*Primary Examiner* — Donald Mills
(74) *Attorney, Agent, or Firm* — Dmitry R. Milikovsky; Florin C. Corie

(57) ABSTRACT

Apparatuses and methodologies are described that coordinate multiple wireless communication protocols within a mobile device. A single mobile device can contain multiple communication components (e.g., a Bluetooth component, an IEEE 802.11b/g component). To prevent interference and possible loss of data, one communication component may be prevented from transmitting or receiving data packets while the other communication component is either transmitting or receiving. The components may be coordinated by a central controller located in the mobile device. Alternatively, the communication components may exchange messages to determine transmission or reception priority. In addition, one communication component may monitor the status of the other communication component to determine unused communication slots.

37 Claims, 10 Drawing Sheets

FOREIGN PATENT DOCUMENTS

WO     WO2006115990     11/2006

OTHER PUBLICATIONS

International Search Report for PCT/US2006/027046 dated Nov. 27, 2006.

IEEE Std. 802.11b Supplement to IEEE Standard for Information technology—Telecommunications and information exchange between systems—Local and metropolitan area networks—Specific requirements—Part 11: Wireless Lan Medium Access Control (MAC) and Physical Layer (PHY) Specifications: Higher-Speed Physical Layer Extension in the 2.4 GHz Band, LAN/MAN Standards Committee of the IEEE Computer Society, Sep. 16, 1999.

IEEE Std. 802.11g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003.

International Preliminary Report on Patentability—PCT/US2006/027046—International Search Authority—The International Bureau of WIPO—Jan. 16, 2008.

Written Opinion—PCT/US2006/027046, International Search Authority—European Patent Office—Nov. 27, 2006.

\* cited by examiner

METHODS AND APPARATUSES FOR INTERWORKING

CROSS-REFERENCE TO RELATED APPLICATIONS

This application claims benefit under 35 U.S.C. §119(e) from U.S. Provisional Patent application Ser. No. 60/698,510 entitled METHODS AND APPARATUSES FOR INTERWORKING VOICE AND DATA APPLICATIONS and filed Jul. 11, 2005, the entirety of which is hereby incorporated by reference.

BACKGROUND

I. Field

The following description relates generally to wireless communications, and, amongst other things, to coordinating communications within an electronic device communicating utilizing two or more separate communication protocols.

II. Background

Many electronic devices utilize multiple communication protocols. For example, a laptop may use a wireless personal area network (WPAN) (e.g., Bluetooth) to connect the laptop to a wireless mouse, wireless keyboard and the like. In addition, the laptop may include an Institute for Electrical and Electronic Engineers (IEEE) 802.11b or 802.11g device to allow the laptop to communicate with a wireless local area network (WLAN). WLANs have become increasingly popular. It is not unusual for people to set up a WLAN in their homes. In addition, WLANs have become widely available at coffee shops, libraries and other public and private locations. Mobile phones have also begun utilizing multiple communication protocols such as Cellular, WLAN and Bluetooth. Mobile phones and personal digital assistants (PDAs) have become multifunctional devices providing email, Internet access as well as traditional cellular communication. Mobile phones may also utilize a WPAN to communicate with an earpiece or other device.

Certain wireless communication protocols overlap each other in terms of the frequency ranges in which they operate. For example, Bluetooth and IEEE 802.11b/g devices share the same spectrum. Bluetooth is a standard communication protocol that provides for data transfer within a range of approximately ten meters. Both Bluetooth and IEEE 802.11b/g devices operate in Industrial, Scientific and Medical (ISM) band between 2.4 GHz and 2.4835 GHz. Bluetooth device transmissions use approximately 1 MHz bandwidth and hop over 79 MHz of the ISM band. Bluetooth devices utilize a frequency hopping spread spectrum technique that changes signal approximately 1600 times per second. IEEE 802.11b/g devices operate at a fixed frequency, one of three non-overlapping 22 MHz channels, or 16.7 Mhz if the device is using orthogonal frequency division multiplexing (OFDM). Therefore, there is approximately a 28% chance (22 channels utilized by IEEE 802.11b/g device/79 total channels) that a Bluetooth transmission will be transmitted in one of the channels being utilized by an IEEE 802.11b/g device and interfere with the WLAN transmission.

In order to mitigate potential for collisions, Bluetooth Version 1.2 specifies an Adaptive Frequency Hopping (AFH) scheme. During AFH, the Bluetooth transmissions avoid channels of IEEE 802.11b/g and hop on remaining spectrum available for Bluetooth transmissions. However, relatively few devices incorporate the AFH scheme at this time. Moreover, when Bluetooth device transmitters and IEEE 802.11b/g device transmitters are co-located within a wireless communication device, e.g. handset, the signal power from one device may interfere with the other device even when the devices are transmitting and receiving at different frequencies.

When the Bluetooth and IEEE 802.11b/g device transceivers are in close proximity, signals being transmitted from the first device can saturate the low noise amplifier (LNA) of the second communication device, causing the second device's receiver to be desensitized. The transmit power of IEEE 802.11b/g devices is approximately 17 dBm. However, these devices operate over a range of up to 30 meters. Therefore, the power at the receiver is quite small. Typically, Bluetooth uses 10 to 15 dB lower power than an IEEE 802.11b/g device, but the range of the Bluetooth device is very short and therefore the power at the receiver is greater. Accordingly, if an IEEE 802.11b/g device is receiving a packet at the same time the Bluetooth device is transmitting, the transmit energy of the Bluetooth device will spill into the transceiver of the IEEE 802.11b/g device and desensitize the receiver. The desensitization of a receiver may cause loss of signal and failure in communication. Co-location of the communication devices may include utilizing the same antenna, location on the same circuit board or coupled circuit boards, location on the same chip or coupled chip sets and combinations thereof.

Co-location of a Bluetooth device and an IEEE 802.11b/g device may result in interruption of signal and loss of data. Therefore, there exists a need to prevent communication failures when a Bluetooth device is co-located with an IEEE 802.11b/g device.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with coordination of multiple wireless communication protocols within a mobile device. A single mobile device may contain multiple communication components (e.g., a Bluetooth component, an IEEE 802.11b/g component). To prevent interference and possible loss of data, one communication component can be prevented from transmitting or receiving data packets while the other communication component is either transmitting or receiving. The components can be coordinated by a central controller located in the mobile device. Alternatively, the communication components can exchange messages to determine transmission or reception priority. In addition, one communication component can monitor status of the other communication component to determine unused communication slots.

According to a related aspect, a method of coordinating communication for multiple wireless communication protocols within the same electronic device can comprise detecting an assignment of at least one time slot for wireless communication of the electronic device utilizing a first communication protocol and controlling wireless communication of the electronic device utilizing a second communication protocol to avoid conflict with wireless communication according to the first communication protocol. Additionally, the method can comprise requesting reassignment of the at least one slot assigned to the first communication protocol, canceling a data packet transmission in response to the request and reassigning the at least one slot to the second communication protocol based upon the request. The method can also comprise determining a frequency hopping schedule for the first communication protocol and filtering the wireless communication according to the first communication protocol utilizing a null filter to avoid interference with the wireless communication according to the second communication protocol. Moreover, the method can comprise monitoring radio frequency (RF) power of a first communication component utilizing the first communication protocol or a Serial Bus Interface (SBI) connected to the first communication component and determining the at least one slot assigned to the first communication component.

According to another aspect, a wireless communication can comprise a processor configured to control communication according to a first communication protocol and a second communication protocol. The processor is further configured to control transmission and reception according to the second communication protocol to avoid conflict with transmission or reception in one or more time slots assigned to the first communication protocol, The processor can request reassignment of the one or more time slots assigned to the first communication protocol. A first communication component can cancel data packet transmission or reception based upon the request and the one or more time slots can be reassigned to the second communication protocol.

According to yet another aspect, an apparatus for coordinating communication for multiple wireless communication protocols within an electronic device can comprise means for detecting an assignment at least one time slot for transmission or reception to a first communication component of the electronic device utilizing a first communication protocol and means for controlling transmission and reception of a second communication component of the electronic device utilizing a second communication protocol to avoid conflict with the transmission or reception of the first communication component. Additionally, the apparatus can comprise means for requesting a reassignment of the at least one slot assigned to the first communication component, means for canceling a data packet transmission in response to the request and means for reassigning the at least one slot to the second communication component based upon the request.

Yet another aspect relates to a computer-readable medium having stored thereon computer-executable instructions for detecting an assignment of at least one time slot for transmission or reception to a first communication component utilizing a first communication protocol and controlling transmission and reception of a second communication component utilizing a second communication protocol to avoid conflict with the transmission or reception of the first communication component.

A further aspect sets forth a mobile device that facilitates coordinating communication for multiple wireless communication protocols within the mobile device, that comprises a first communication component utilizing a first communication protocol, the first communication component assigned at least one time slot for transmission or reception and a second communication component utilizing a second communication protocol, the second communication component includes a processor that controls transmission and reception of the second communication component to avoid conflict with transmission or reception of the first communication component. Moreover, the mobile device is at least one of a cellular phone, a smartphone, a handheld communication device, a handheld computing device, a satellite radio, a global positioning system, a laptop and a PDA.

Yet another aspect relates to a processor that executes instructions for coordinating communication for multiple wireless communication protocols within an electronic device that comprises detecting an assignment of at least one time slot for transmission or reception to a first communication component of the electronic device utilizing a first communication protocol and controlling transmission and reception of a second communication component of the electronic device utilizing a second communication protocol to avoid conflict with the transmission or reception of the first communication component. Additionally, the instructions can comprise requesting a reassignment of the at least one slot assigned to the first communication component and reassigning the at least one slot to the second communication component based upon the request.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
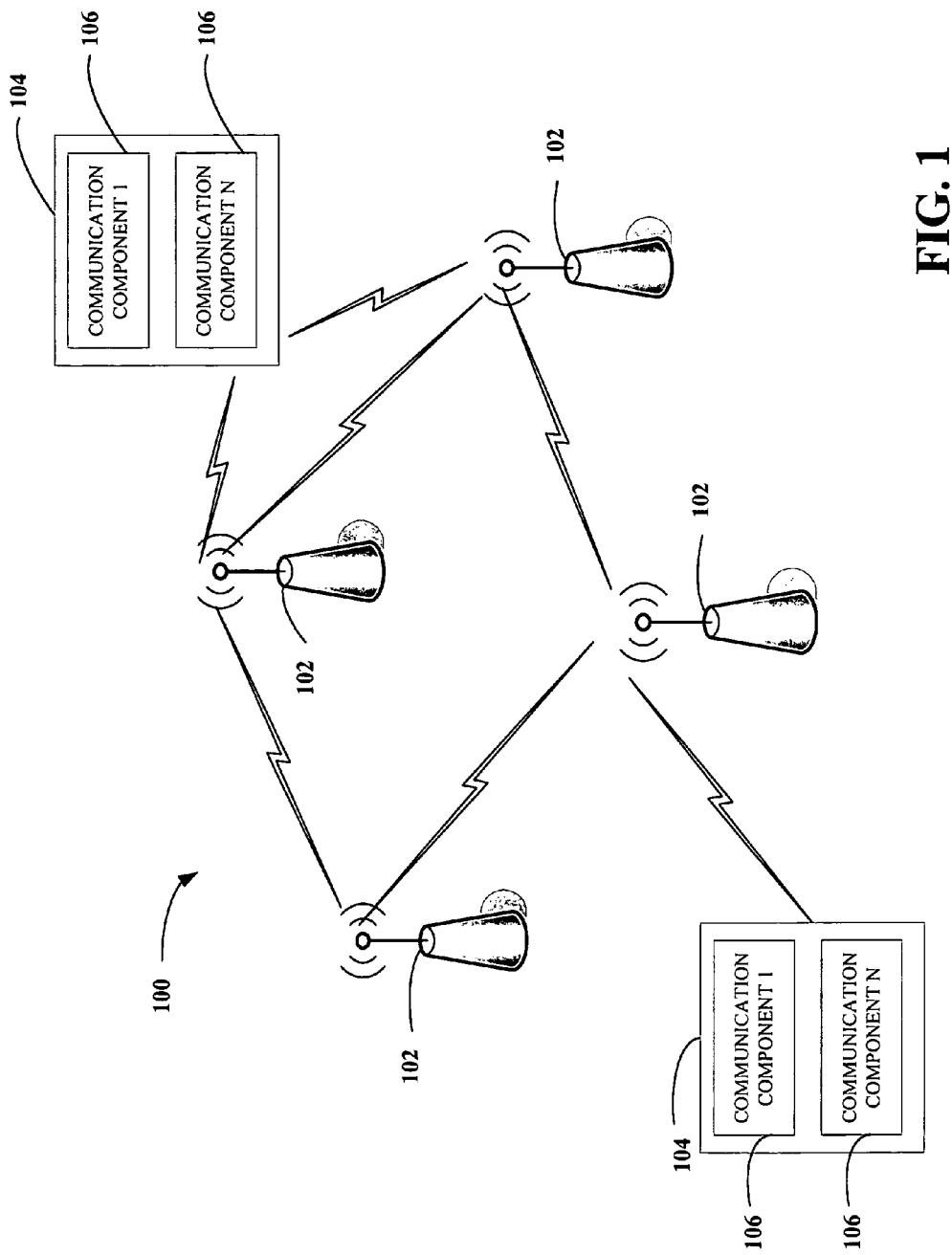
FIG. 1 illustrates a wireless communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to FIG. 1, a wireless communication system 100 in accordance with various embodiments presented herein is illustrated. System 100 can comprise one or more access points 102 that receive, transmit, repeat, etc., wireless communication signals to each other and/or to one or more mobile devices 104. Each access point 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Mobile devices 104 can include multiple communication components 106 that afford for communicating across different protocols (e.g., Bluetooth and IEEE 802.11b/g). It is to be appreciated that N number of communication components 106 may be included in mobile device 104, where N is an integer. Coordination of transmission and reception by communication components 106 can provide concurrent communication across multiple communication protocols and mitigate signal interference and data loss. It is to be appreciated that communication components 106 may be hardware, software or a combination thereof. Mobile devices 104 can be, for example, cellular phones, smart phones, laptops, handheld communication devices, handheld computing devices, satellite radios, global positioning systems, PDAs, and/or any other suitable device for communicating over wireless system 100.

In wireless system 100, the periodic transmission of small data packets called beacons from access points 102 advertise presence of the wireless system and transmit system information. Mobile devices 104 sense the beacons and attempt to establish a wireless connection to access points 102.

Figure 2:
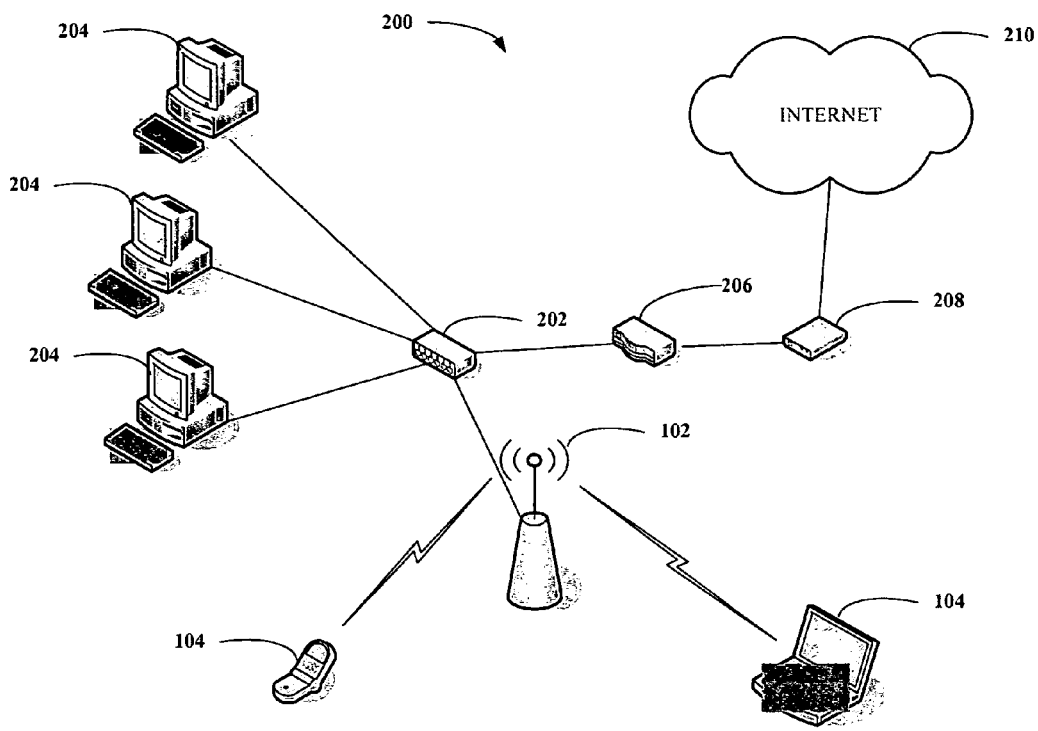
FIG. 2 is an illustration of a wireless communication system according to one or more embodiments.

FIG. 2 illustrates a system 200 including a WLAN associated with a wired local area network (LAN). Access point 102 is in communication with mobile devices 104. Although a single access point 102 is illustrated for simplicity, the WLAN can include multiple access points 102. Access point 102 is connected to an Ethernet hub or switch 202. Ethernet hub 202 can be connected to one or more electronic devices 204 including personal computers, peripheral devices (e.g., facsimile machines, copiers, printers, scanners, etc.), servers and the like. Ethernet hub 202 can also be connected to a router 206 that transmits data packets to a modem 208. Modem 208 can transmit data packets to a wide area network (WAN) 210, such as the Internet. Alternatively, router 206, Ethernet hub 202 and access point 102 can be combined in a single wireless router. System 200 illustrates a single, simple network configuration. Many additional configurations including alternative electronic devices are possible, as will be appreciated by one with ordinary skill in the art.

The WLAN system illustrated in FIG. 2 may be utilized with Voice over Internet Protocol (VoIP) to provide phone service. VoIP is a system in which the Internet is used as a telephone network. Voice information is transmitted in data packets, referred to herein as voice packets. In one or more embodiments a mobile device, such as a mobile telephone, can utilize an IEEE 802.11b/g device to connect to a WLAN. The WLAN, in turn, can be connected to the Internet, as shown in FIG. 2. Accordingly, the mobile device can utilize VoIP to complete phone calls. The mobile device can also include a Bluetooth device, located in close proximity to the IEEE 802.11b/g device, for example, within the handset of a mobile phone. The mobile device can also include an earpiece having a Bluetooth device in communication with the Bluetooth Device in the handset. Consequently, voice packets can be received via the WLAN at the handset and transmitted to the earpiece using the Bluetooth protocol.

In one or more embodiments, transmission and reception using the IEEE 802.11b/g device is coordinated with the Bluetooth device. The conflict between the communication protocols can be negated by avoiding transmitting on one device while receiving on the other device, transmitting simultaneously on the two devices and receiving simultaneously on the devices. While the systems and methodologies herein are described using the Bluetooth and IEEE 802.11b/g communication protocols, it will be readily appreciated by one of ordinary skill in the art that the systems and methodologies are applicable to additional communication protocols. For example, other 802.11 protocols or Wide Area Network Protocols.

Figure 3:
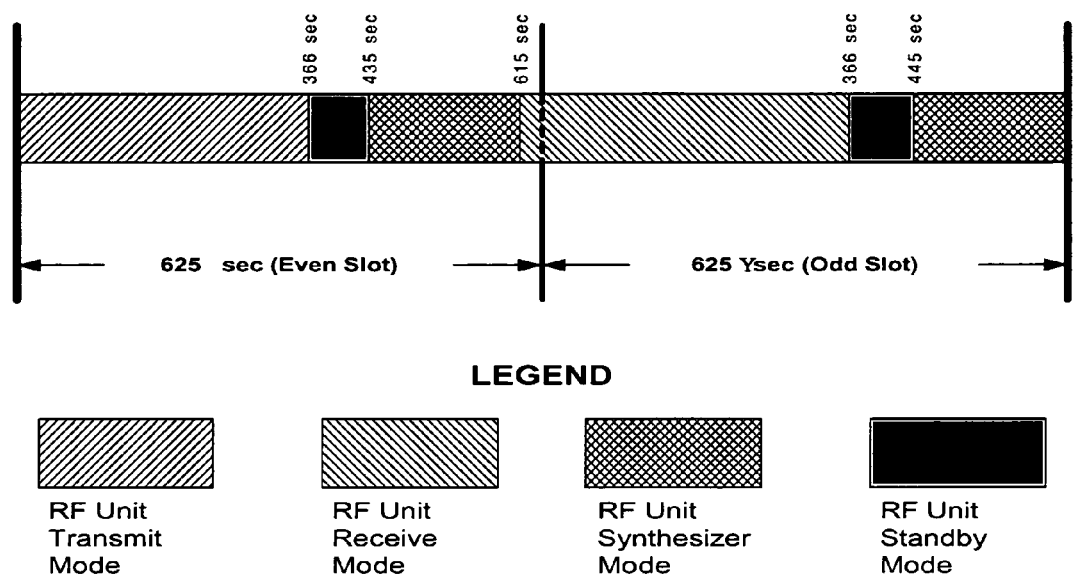
FIG. 3 illustrates Bluetooth transmission and reception scheduling, in accordance with one or more aspects presented herein.

FIG. 3 illustrates a High Quality Voice HV1 mode of transmission for the Bluetooth protocol. HV1 mode uses a frame size that includes even and odd slots that are typically 625 microseconds in length. Even slots are allotted for transmission and odd slots are allotted for reception. The Bluetooth device can utilize Synchronous Channel Operation (SCO). As can be seen in FIG. 3, during the frame there is a gap of approximately 250 microseconds between transmission and reception. This gap includes a standby mode and synthesizer mode. During these two modes the IEEE 802.11b/g device can transmit or receive without interference from the Bluetooth device.

In one or more embodiments, an IEEE 802.11b/g can transmit or receive data packets during the gap between transmission and reception by the Bluetooth device. For large-sized data packets (approximately 1500 bytes), the probability of the IEEE 802.11b/g device properly receiving or transmitting without overlapping with transmission or reception by the Bluetooth device is approximately five percent. In contrast, the likelihood of impact of IEEE 802.11b/g device transmission on Bluetooth transmissions is relatively small. Approximately 80-90% of Bluetooth traffic is unaffected by WLAN transmission. This is due to the fact that WLAN transmission and reception is comparatively quick. The transmission rate of the IEEE 802.11b/g devices is significantly faster than that of Bluetooth devices.

In one or more embodiments, the Bluetooth transmission mode can utilize Bluetooth 2.0, without coding and including additional slots. For example, High Quality Voice mode HV3 has an enhanced data rate of two Megabits per second and provides a frame size of 16 slots, approximately equal to 10 milliseconds. The first two slots are identical to the even and odd slots of HV1, illustrated in FIG. 3. The first slot is allotted to transmitting and the second slot is allotted to receiving, with a 250-microsecond gap between transmission and reception. The remaining fourteen slots are unused. Therefore, the unused slots can be utilized by the IEEE 802.11b/g device for transmitting and receiving. In HV3, if the Bluetooth device is utilized only for voice transmission, the IEEE 802.11b/g device may be able to achieve an 87% throughput, without coordinating the transmission and reception of the Bluetooth and IEEE 802.11b/g devices.

In one or more embodiments, the Bluetooth device mode can utilize High Quality Voice mode HV2. HV2 uses Bluetooth 2.0 without coding. HV2 includes 16 frame slots, approximately equal to 10 milliseconds. In contrast to the transmission modes discussed above, HV2 utilizes the first two slots for transmission and the third and fourth slot for reception. This leaves twelve additional, unused slots that can be utilized by the IEEE 802.11b/g device. When using the HV2 transmission mode, if the device is used only for voice transmission, the IEEE 802.11b/g device may be able to achieve a 70% throughput without coordinating transmission and reception of the Bluetooth and IEEE 802.11b/g devices.

In one or more additional embodiments, the Bluetooth transmission mode can include coding. In Bluetooth 2.0 HV1, the first, second and third slots are allotted to transmitting, while the fourth, fifth and sixth slots are allotted for receiving. This leaves ten unused slots in which the IEEE 802.11b/g device can transmit and receive data. If the Bluetooth device is transmitting and receiving only voice data in the described transmission mode, the IEEE 802.11b/g device may be able to achieve a 62% throughput without coordinating transmission and reception of the Bluetooth and IEEE 802.11b/g devices.

Figure 4:
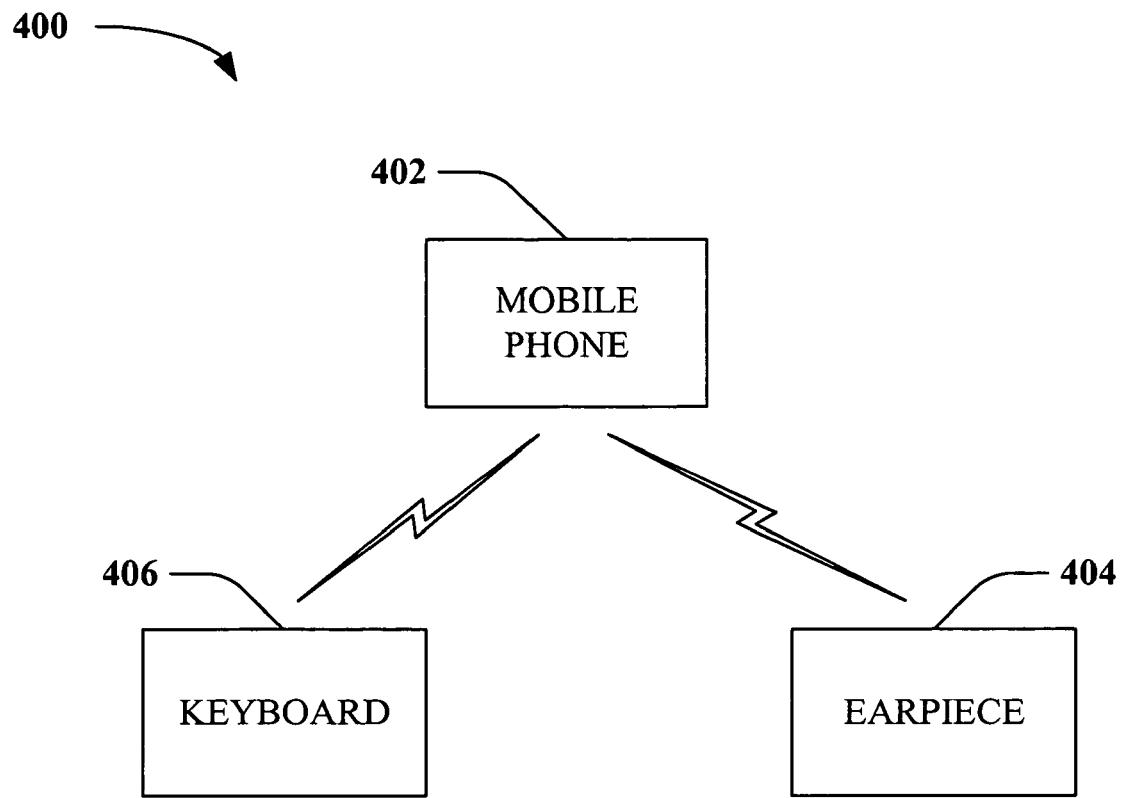
FIG. 4 illustrates a mobile device utilizing multiple Bluetooth devices, in accordance with one or more aspects presented herein.

Referring now to FIG. 4, a mobile device can communicate with multiple Bluetooth devices. A single Bluetooth device in the mobile device can serve as a master device and communicate with multiple slave Bluetooth devices. For example, a mobile communication system 400 can include a handset of a multifunctional mobile phone 402, an earpiece 404 and a keyboard 406. Handset 402 includes a master Bluetooth device that controls communication with slave Bluetooth devices located in earpiece 404 and keyboard 406. The master Bluetooth device can communicate with the slave Bluetooth devices simultaneously. Alternatively, the master Bluetooth device can communicate with the slave Bluetooth devices individually by switch rapidly between slave Bluetooth devices. If a Bluetooth device is communicating with multiple slave units, the device may require additional frame slots in which to transmit and receive data packets.

Figure 5:
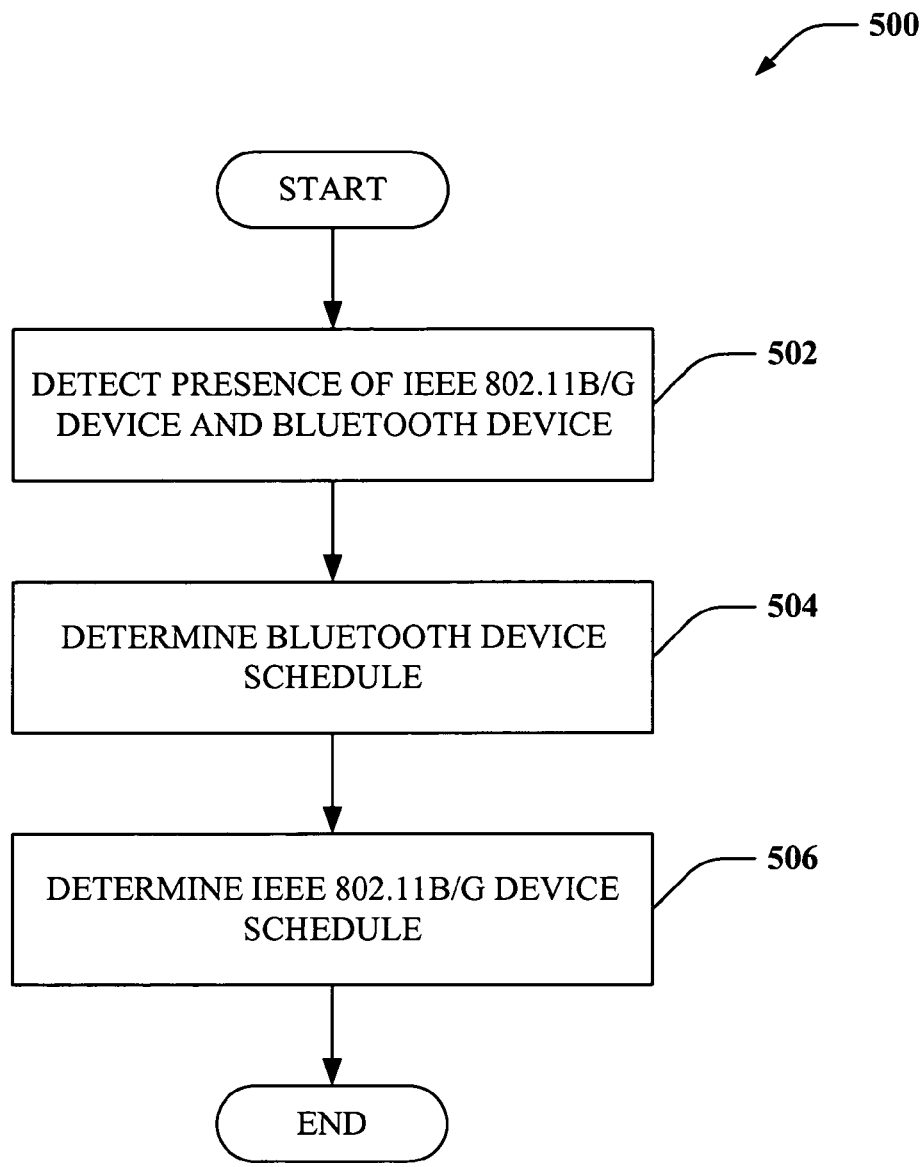
FIG. 5 illustrates a methodology for coordinating communication between an IEEE 802.11b/g device and a Bluetooth device, in accordance with one or more aspects presented herein.
Figure 6:
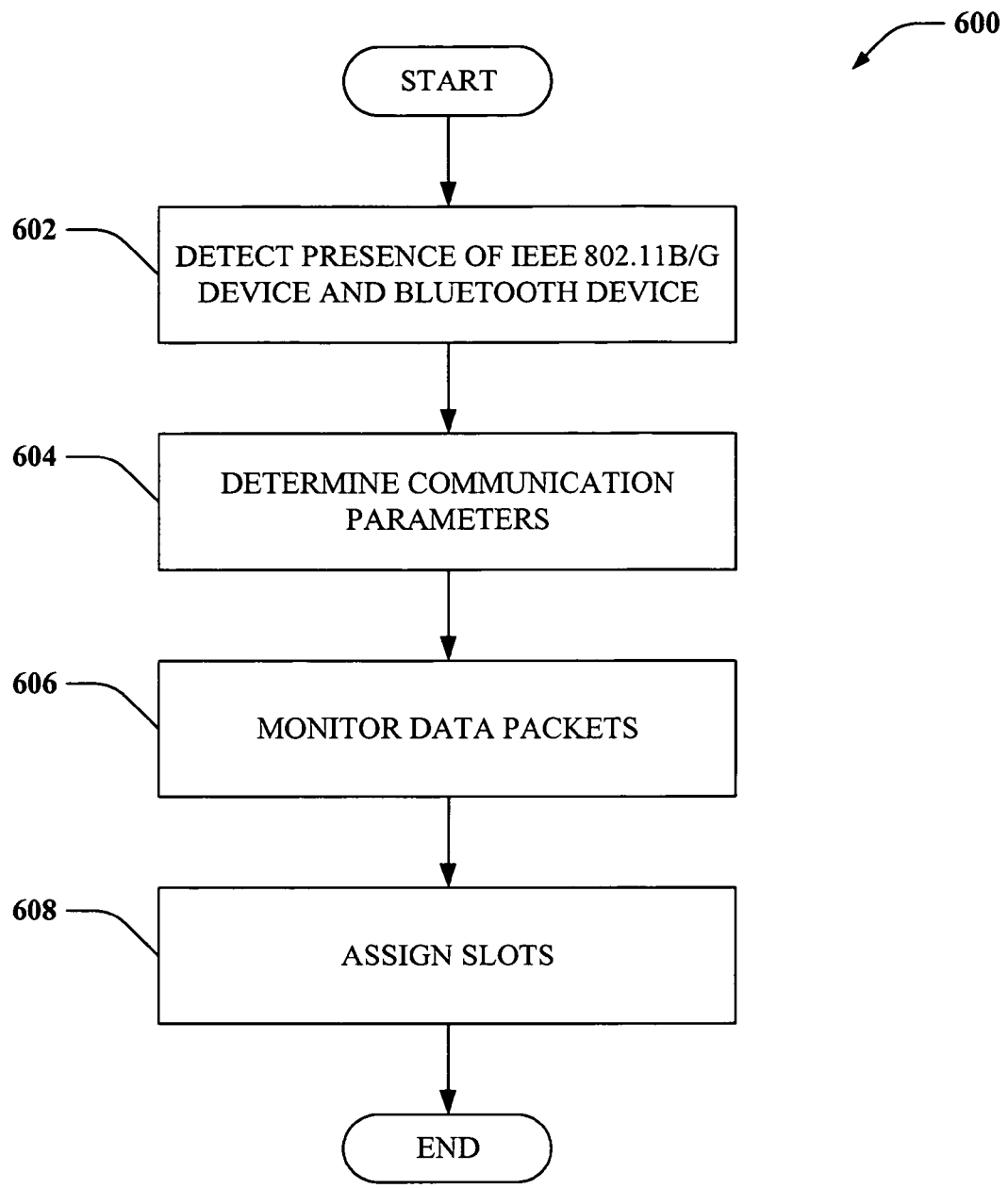
FIG. 6 illustrates a methodology for coordinating communication utilizing a controller component, in accordance with one or more aspects presented herein.
Figure 7:
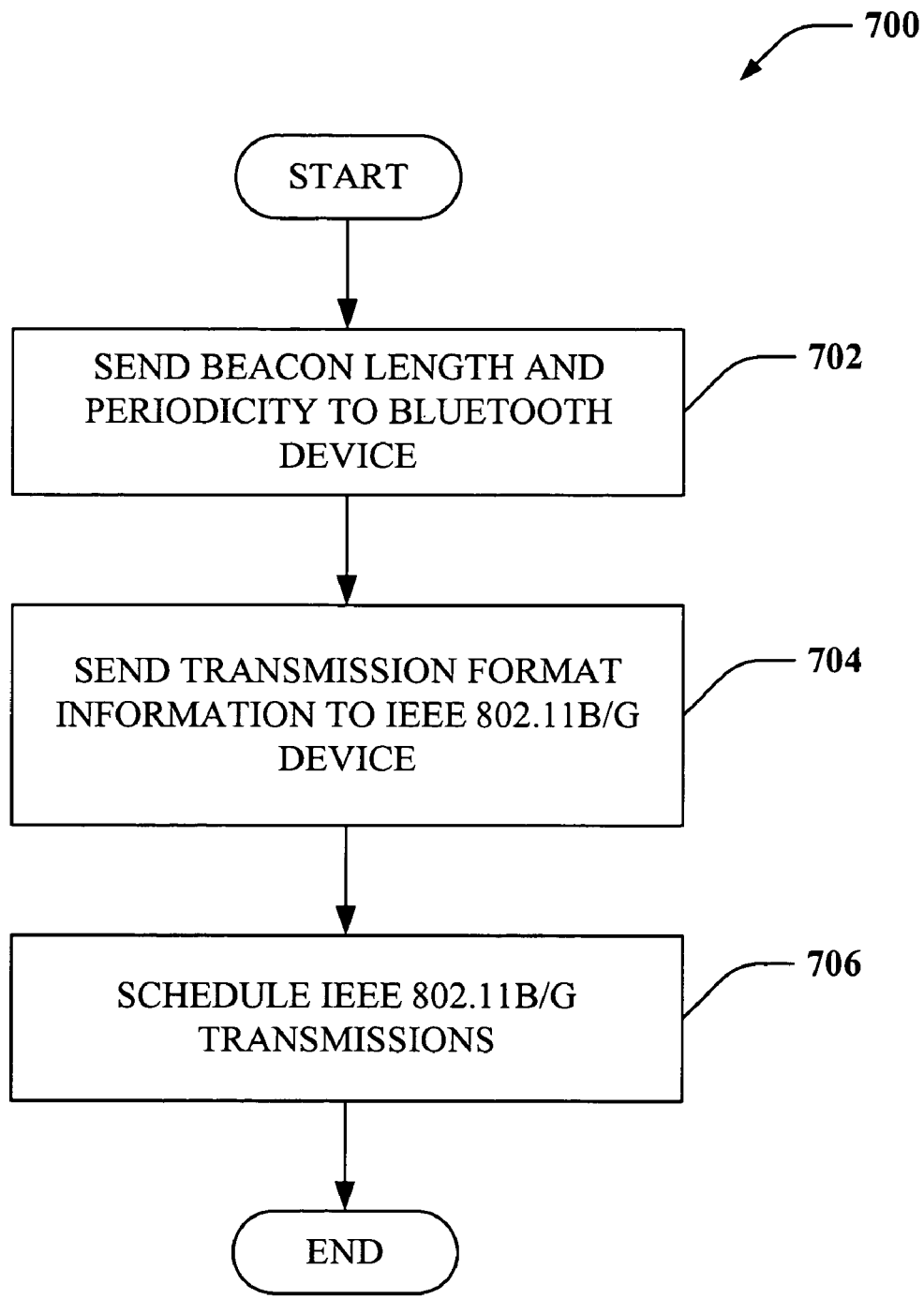
FIG. 7 illustrates a methodology for coordinating communication utilizing messaging between the communication devices, in accordance with one or more aspects presented herein.

Referring to FIGS. 5-7, methodologies relating to coordination of communication protocols are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments. Additionally, although the methodologies are described herein with respect to the Bluetooth and IEEE 802.11b/g devices, the methodologies are applicable to additional communication protocols and are not limited to the Bluetooth and IEEE 802.11b/g devices.

Referring now to FIG. 5, a methodology 500 for coordinating communication in a wireless communication environment, in accordance with one or more embodiments presented herein is illustrated. At 502, the presence of both a Bluetooth device and an IEEE 802.11b/g device within the mobile device is detected. A transmission and reception schedule for the Bluetooth device is determined at 504. Based upon the schedule of the Bluetooth device, the transmission and reception of the IEEE 802.11b/g device is determined at 506. Typically, a Bluetooth device has a relatively rigid transmission and reception schedule, as illustrated in FIG. 3. Accordingly, it may be more practical to adapt the transmission and reception of the IEEE 802.11b/g device rather than to modify the transmission and reception schedule of the Bluetooth device.

FIG. 6 illustrates a methodology 600 for coordinating communication in a wireless communication environment, in accordance with one or more embodiments presented herein. In one or more aspects, a controller component can control both WLAN and Bluetooth transmissions. The controller component can be implemented within a processor controlling the wireless communication device. For example, the controller component can be located in the processor of a handset of a mobile phone. The mobile phone can use VoIP via a WLAN as well as an earpiece utilizing a Bluetooth device. At 602, the controller component detects the presence of the Bluetooth and IEEE 802.11b/g device. At 604, the controller component determines certain system parameters. For example, the WLAN may require a minimum throughput to ensure adequate data transmission. The controller component can schedule voice and data packets based upon quality of service or other parameters, while at the same time preventing simultaneous WLAN and Bluetooth reception and transmission. The controller component can access the media access control layer (MAC) layer of WLAN and Bluetooth data packets at 606 to determine the type of data within the packets. Depending upon the type of data, the controller component can reschedule the voice or data packet. In one or more aspects, the IEEE 802.11b/g device can act as the controller component and coordinate WLAN and Bluetooth transmissions and receptions.

In one or more further aspects, the controller component can be implemented at an access point. Access points may be unable to detect the presence of a Bluetooth device due to the relatively small transmission area of the WPAN. However, the IEEE 802.11b/g device within the mobile device can notify the access point of the presence of a Bluetooth device to facilitate coordination of the communication protocols. The access point can schedule multiple Bluetooth devices, but need not synchronize the Bluetooth devices to each other. The access point need only coordinate co-located IEEE 802.11b/g and Bluetooth devices.

In one or more other embodiments, the beacon interval of the access point can be divided between WLAN and Bluetooth transmissions. The beacon interval is the time between beacon transmissions by the access point. The beacon interval can be divided into a WLAN interval and a Bluetooth interval to provide for communication for both devices. The access point can schedule a WLAN interval followed by a Bluetooth interval, although not necessarily in that order.

In one or more aspects, the Bluetooth device schedule remains virtually unchanged while the WLAN transmissions are manipulated to avoid conflict with the Bluetooth device. Accordingly, the coordinating component, whether implemented within the IEEE 802.11b/g device, as a separate controller component or any other possible implementation, should first detect the presence and determine the transmission schedule of a Bluetooth device prior to scheduling WLAN transmissions. To determine the Bluetooth transmission and reception schedule, the coordinating component can monitor the RF power emitted by the Bluetooth device to identify transmission and reception slots. Once the coordinating component has determined the slots utilized by the Bluetooth device, it can calculate the timing for unused slots and schedule WLAN transmission and reception during those slots.

In one or more aspects, the coordinating component can monitor a Serial Bus Interface (SBI) for messages between the Bluetooth device and a central processor of the mobile device (e.g., the Mobile Station Modem chipset (MSM) in a mobile phone). The Bluetooth device and mobile device central processor can exchange messages prior to transmission and reception. Consequently, these messages can be used to determine approximate timing of transmission and reception activity. The coordinating component can schedule the transmissions and receptions of the IEEE 802.11b/g device to avoid collision with transmissions and receptions of the Bluetooth device.

Referring now to FIG. 7, a methodology 700 for coordinating communication in a wireless communication environment, in accordance with one or more embodiments presented herein is illustrated. In one or more aspects, the IEEE 802.11b/g device and the Bluetooth device can exchange messages to coordinate the WLAN and Bluetooth communication protocols. Both the Bluetooth device and the IEEE 802.11b/g device include processors and controllers capable of managing messages between the devices. In some embodiments, to promote interoperability, the IEEE 802.11b/g device sends messages containing information regarding beacon periodicity and beacon lengths at 702 to the Bluetooth device. The messages may be sent irrespective of whether there is a voice call in progress or not.

When the Bluetooth device initializes communication, the Bluetooth device can send a message to the IEEE 802.11b/g device including information regarding transmission format at 704. For example, in a mobile phone utilizing an earpiece, when a voice call is set up the Bluetooth device can send a message to IEEE 802.11b/g device including information regarding the voice quality standard utilized, e.g. HV1, HV2, HV3 and number of slots to be used by the Bluetooth device.

At 706, the IEEE 802.11b/g device schedules WLAN voice packet transmissions to avoid collision with the Bluetooth device transmissions and receptions.

In addition, the IEEE 802.11b/g device may send messages to Bluetooth device requesting time slots. The IEEE 802.11b/g device messages may include information regarding on Beacon periodicity, length and service times. It is important that the IEEE 802.11b/g device receive beacons from the access port to maintain WLAN communication. Beacons include registration and other vital information. If the IEEE 802.11b/g device is unable to receive beacons via the WLAN because of Bluetooth transmissions or receptions, the IEEE 802.11b/g device can request the Bluetooth device to stagger slot assignment to allow beacon reception. In these circumstances, the Bluetooth device can identify and reallocate slots from the current Bluetooth schedule so as not to interfere with high priority WLAN traffic, such as beacons. In addition, the WLAN can send a request to Bluetooth to reschedule the slot assignment in order to allow WLAN transmissions due to quality of service requirements, emergency call requirements, or other similar types of requirements. The Bluetooth device can reschedule generating a delay of approximately ten of milliseconds. This may result in a small glitch for the in the voice call.

In one or more further embodiments, the IEEE 802.11b/g device can send a message to the Bluetooth device to indicate beacon periodicity and beacon lengths prior to setting up a voice call and then monitor Bluetooth transmissions via the SBI interface. When a voice call is initialized, the Bluetooth device determines the appropriate transmission format and slots and sends a message to IEEE 802.11b/g device including the voice quality (e.g., HV1, HV2, etc.) and number of slots that the Bluetooth device will utilize. Thereafter, the IEEE 802.11b/g device monitors the SBI Interface between the MSM and Bluetooth device. The MSM sends packets to the Bluetooth device just prior to transmission and sends packet end message to the Bluetooth device upon completion of transmission. The MSM receives packet start and packet end messages for reception by the Bluetooth device. Therefore, the IEEE 802.11b/g device is able to calculate the approximate timing of Bluetooth device transmissions and receptions by monitoring SBI interface messages.

In one or more further embodiments, the MSM can provide common timing to both the Bluetooth device and the IEEE 802.11b/g device. Once both devices have common timing, monitoring the SBI becomes unnecessary. The devices are able to determine their allotted slots without using the triggering messages.

In one or more aspects, the Bluetooth device slot assignment is circuit-like and medium access by the slave on the allotted slots cannot be easily preempted. In such cases, changing slot assignment during voice communication is difficult. The Bluetooth device may interrupt the call and reinitialize the voice packet transfer in order to change the slot assignment. To prevent coordination problems the IEEE 802.11b/g device should schedule voice traffic away from Bluetooth allotted slot times and Bluetooth device should control transmission and reception for less than 50% of the time.

In one or more alternative embodiments, the Bluetooth device and the IEEE 802.11b/g device can include control signals, such that when the Bluetooth device is transmitting or receiving voice or data packets the signal set to high. The signal is returned to low once the transmission or reception of voice or data packets is complete. Similarly, the IEEE 802.11b/g device can include a signal to the Bluetooth device indicating when a WLAN transmission is being transmitted or received.

In one or more embodiments, the IEEE 802.11b/g device can utilize a filter to eliminate conflicts with Bluetooth device transmissions. The Bluetooth device transmissions are narrowband (1 MHz) interferers for the broadband channels of a (22/20 MHz) WLAN receiver. The WLAN receiver can use a programmable notch filter to null out the Bluetooth transmission. In order to null the Bluetooth transmission, the WLAN receiver would need to determine the Bluetooth hopping pattern and the timing to track the interference. Tracking and calculating the frequency hopping of the Bluetooth transmission requires additional signal processing adding significant complexity to WLAN receiver.

In one or more other embodiments, the IEEE 802.11b/g device utilizes unscheduled automatic powersave delivery (UAPSD) mode to avoid transmitting or receiving during slots allotted to the Bluetooth device. In UAPSD mode, the IEEE 802.11b/g device enters into sleep mode when it is not transmitting or receiving packets. The IEEE 802.11b/g device wakes up autonomously. Although originally intended as a power saving feature, the UAPSD mode can be used to prevent the IEEE 802.11b/g device from conflicting with the Bluetooth device. In UAPSD mode, the IEEE 802.11b/g device will enter sleep mode during the Bluetooth transmit/receive cycle. When the transmit/receive cycle is complete, the IEEE 802.11b/g device will send a "Trigger" message to the WLAN access point. Upon receiving the trigger, the access point will send all the voice or data packets that have been stored for the IEEE 802.11b/g device while the device was in sleep mode. In this manner, the IEEE 802.11b/g device avoids interference with the Bluetooth transmissions and receptions.

In one or more alternate embodiments, scheduled APSD mode may be used by the IEEE 802.11b/g device to avoid interference with Bluetooth transmissions and receptions. If scheduled APSD is utilizied, the IEEE 802.b/g device requests scheduled transmissions and receptions from the access point. The scheduled transmissions and receptions are scheduled so as not to interfere with Bluetooth transmissions and receptions.

It will be appreciated that, in accordance with one or more embodiments described herein inferences can be made regarding transmission formats, frequencies, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences regarding the presence of Bluetooth devices, the transmission format of any Bluetooth devices, etc. It will be appreciated that the foregoing examples are illustrative in nature and are not intended to limit the number of inferences that can be made or the manner in which such inferences are made in conjunction with the various embodiments and/or methods described herein.

Figure 8:
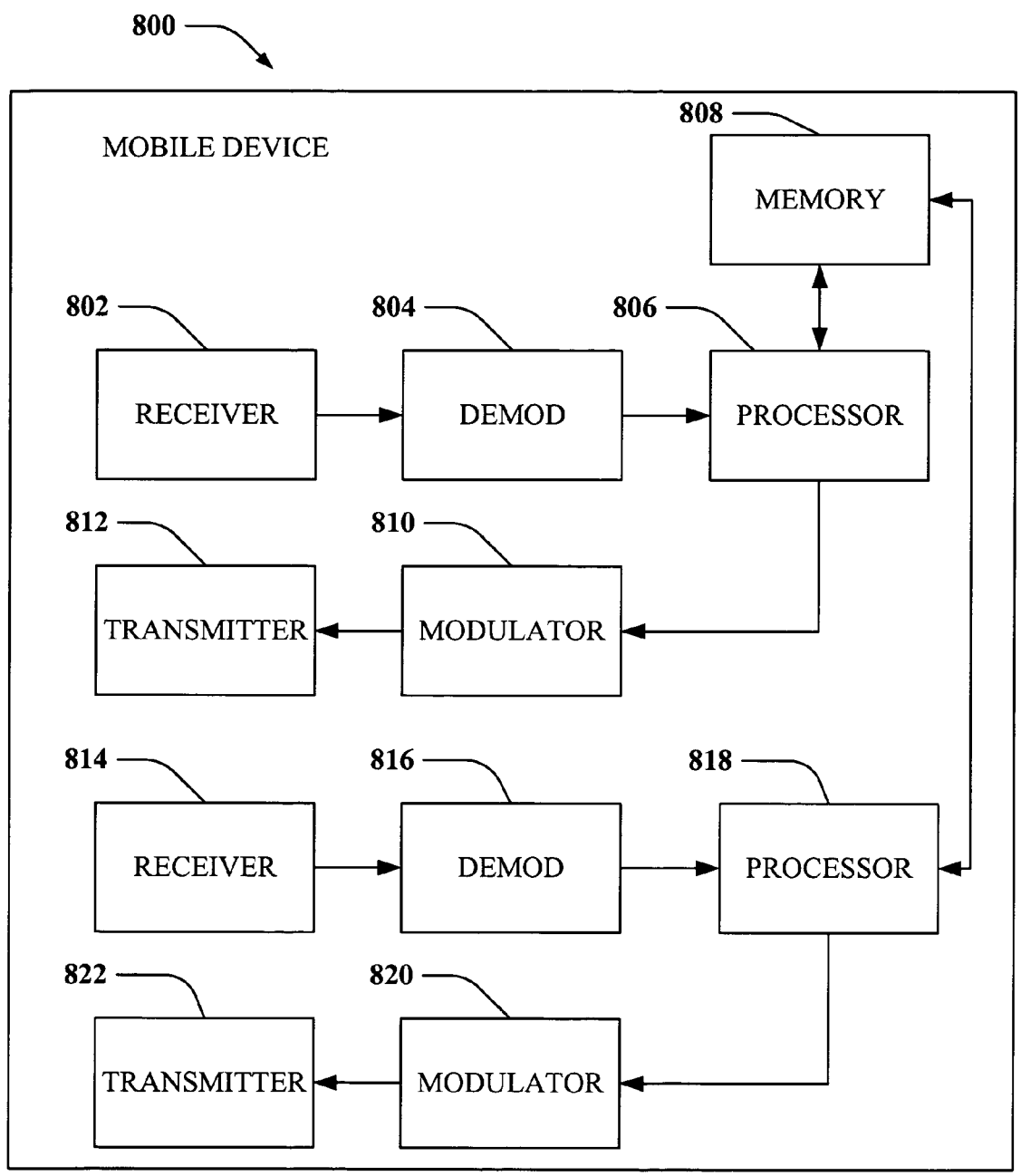
FIG. 8 is an illustration of a system that coordinates communication between multiple communication protocols in a wireless communication environment in accordance with one or more embodiments set forth herein.

FIG. 8 is an illustration of a system 800 that facilitates coordinated communication between multiple communication protocols in a wireless communication environment in accordance with one or more embodiments set forth herein. System 800 can reside in an access point and/or in a user device. System 800 comprises a receiver 802 that receives a signal from, for instance a receive antenna, and performs typical actions thereon (e.g., filters, amplifies, downconverts, etc.) the received signal and digitizes the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 816. Processor 806 can be a processor that controls one or more components of user device 800, and/or a processor that analyzes information received by receiver 802, generates information for transmission by transmitter 816 and controls one or more components of user device 800. Processor 806 can include a controller component capable of coordinating communications with additional user devices. Processor 806 can include an optimization component (not shown) that coordinates communication utilizing multiple communication protocols. It is to be appreciated that the optimization component can include optimization code that performs utility based analysis in connection with assigning time slots for data packet transmission and reception. The optimization code can utilize artificial intelligence based methods in connection with performing inference and/or probabilistic determinations and/or statistical-based determinations in connection with optimizing time slot assignment.

User device 800 can additionally comprise memory 808 that is operatively coupled to processor 806 and that stores information related to coordinating communications and any other suitable information. Memory 808 can additionally store protocols associated with coordinating communication. It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 still further comprises a symbol modulator 810 and a transmitter 812 that transmits the modulated signal.

In addition, user device 800 can include a second receiver 814 that receives a signal from, for instance a receive antenna, and performs typical actions thereon (e.g., filters, amplifies, downconverts, etc.) the received signal and digitizes the conditioned signal to obtain samples. A second demodulator 816 can obtain received symbols for each symbol period, as well as provide received symbols to a second processor 818. Second processor 818 may be operatively connected to memory 808. Second processor 818 can also include an optimization component, similar to that described above in connection with processor 806. User device 800 still further comprises a second symbol modulator 820 and a second transmitter 822 that transmits the modulated signal.

Figure 9:
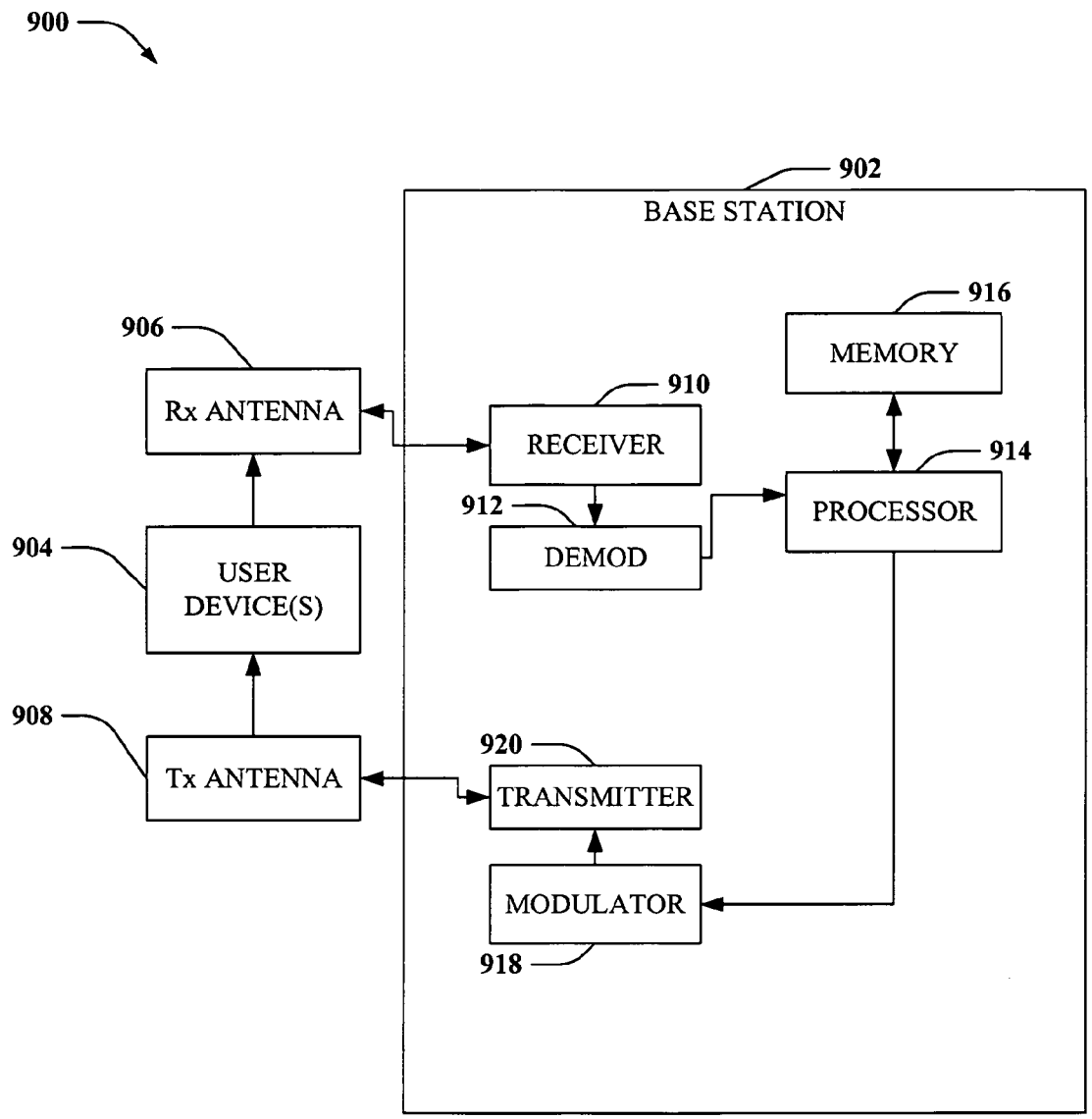
FIG. 9 is an illustration of a system that coordinates communication in wireless communication environment in accordance with various aspects.

FIG. 9 is an illustration of a system 900 that facilitates coordination of communication protocols in accordance with various aspects. System 900 comprises a base station or access point 902 As illustrated, base station 902 receives signal(s) from one or more user devices 904 via a receive antenna 906, and transmits to the one or more user devices 904 through a transmit antenna 908.

Base station 902 comprises a receiver 910 that receives information from receive antenna 906 and is operatively associated with a demodulator 912 that demodulates received information. Demodulated symbols are analyzed by a processor 914 that is similar to the processor described above with regard to FIG. 8, and is coupled to a memory 916 that stores information. A modulator 918 can multiplex the signal for transmission by a transmitter 920 through transmit antenna 908 to user devices 904.

Figure 10:
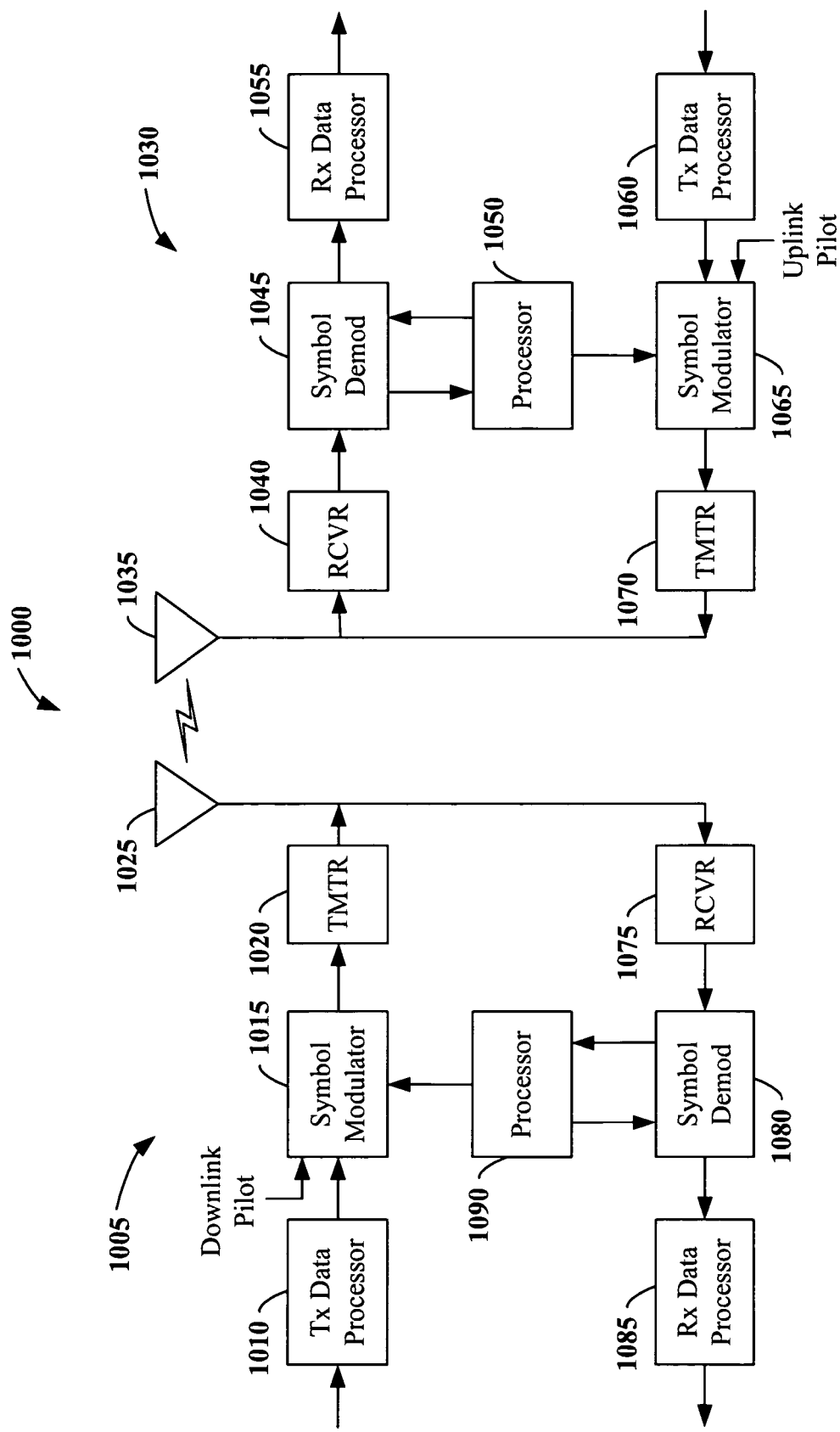
FIG. 10 is an illustration of a wireless communication environment that can be employed in conjunction with the various systems and methods described herein.

FIG. 10 shows an exemplary wireless communication system 1000. The wireless communication system 1000 depicts one base station and one terminal for sake of brevity. However, it is to be appreciated that the system can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems (FIGS. 8-9) and/or methods (FIGS. 5-7) described herein to facilitate wireless communication there between.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. Symbol modulator 1015 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM); or code division multiplexed (CDM). In the case of an OFDM system, symbol modulator 1015 can transform each set of N transmit symbols to the time domain using an N-point IFFT to obtain a "transformed" symbol that contains N time-domain chips. Symbol modulator 1015 typically repeats a portion of each transformed symbol to obtain a corresponding symbol. The repeated portion is known as a cyclic prefix and is used to combat delay spread in the wireless channel.

A transmitter unit (TMTR) 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 obtains N received symbols and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of coordinating communication for multiple wireless communication protocols within an electronic device, comprising:
   detecting an assignment of at least one time slot for wireless communication at the electronic device utilizing a first communication protocol; and
   controlling wireless communication between the electronic device and an access point utilizing a second communication protocol by sending a control signal to the access point for coordinating access point scheduling during the at least one slot assigned to the first communication protocol to avoid conflict with wireless communication according to the first communication protocol.

2. The method of claim 1, further comprising using a Bluetooth communication protocol as the first communication protocol.

3. The method of claim 1, further comprising using one of IEEE 802.11b communication protocol or IEEE 802.11g communication protocol as the second communication protocol.

4. The method of claim 1, further comprising:
   requesting reassignment of the at least one slot assigned to the first communication protocol;
   canceling data packet transmission or reception in response to the request; and
   reassigning the at least one slot to the second communication protocol based upon the request.

5. The method of claim 1, further comprising:
   determining a frequency hopping schedule for the first communication protocol; and
   filtering the wireless communication according to the first communication protocol utilizing a null filter to avoid interference with the wireless communication according to the second communication protocol.

6. The method of claim 1, further comprising:
   monitoring radio frequency (RF) power of a first communication component utilizing the first communication protocol; and
   determining the at least one slot assigned to the first communication protocol based upon the RF power.

7. The method of claim 1, further comprising:
   monitoring traffic on a serial bus interface (SBI) connected to a first communication component utilizing the first communication protocol; and
   determining the at least one slot assigned to the first communication protocol based upon the SBI traffic.

8. The method of claim 1, further comprising:
   utilizing a power saving feature of a second communication component utilizing the second communication protocol during the at least one slot assigned to the first communication protocol.

9. The method of claim 1, further comprising:
   utilizing a scheduling feature of a second communication component utilizing the second communication protocol during the at least one slot assigned to the first communication protocol.

10. The method of claim 1, further comprising:
    transmitting a message from a first communication component utilizing the first communication protocol to a second communication component utilizing the second communication protocol, the message comprises a schedule for the at least one slot assigned to the first communication protocol.

11. A wireless communication apparatus comprising:
    a processor configured to control communication according to a first communication protocol and a second communication protocol, the processor further configured to control transmission and reception between the wireless communication apparatus and an access point according to the second communication protocol by sending a control signal to the access point for coordinating access point scheduling during one or more time slots assigned to the first communication protocol to avoid conflict with transmission or reception in the one or more time slots assigned to the first communication protocol; and
    a memory coupled with the processor.

12. The apparatus of claim 11, the first communication protocol is the Bluetooth communication protocol.

13. The apparatus of claim 11, the second communication protocol is one of IEEE 802.11b and IEEE 802.11g communication protocols.

14. The apparatus of claim 11, the processor requests reassignment of the one or more time slots assigned to the first communication protocol, a first communication component utilizing the first communication protocol cancels a data packet transmission or reception based upon the request and the one or more time slots is reassigned to the second communication protocol.

15. The apparatus of claim 11, further comprising a null filter that filters transmissions and receptions according to the first communication protocol.

16. The apparatus of claim 11, the processor monitors radio frequency (RF) power of a first communication component utilizing the first communication protocol and determines the one or more time slots assigned to the first communication protocol.

17. The apparatus of claim 11, further comprising a serial bus interface (SBI) connected to a first communication component utilizing the first communication protocol, the processor monitors SBI traffic from the first communication component and determines the one or more time slots assigned to the first communication protocol.

18. The apparatus of claim 11, further comprising a power saving function of a second communication component utilizing the second communication protocol utilized during the one or more time slots assigned to the first communication protocol.

19. The apparatus of claim 11, a first communication component utilizing the first communication protocol transmits to a second communication component utilizing the second communication protocol a schedule for the at least one slot assigned to the first communication protocol.

20. A wireless communication apparatus for coordinating communication for multiple wireless communication protocols within an electronic device, comprising:

means for detecting an assignment of at least one time slot for transmission or reception to a first communication component of the electronic device utilizing a first communication protocol; and means for controlling transmission and reception between a second communication component of the electronic device and an access point utilizing a second communication protocol by sending a control signal to the access point for coordinating access point scheduling during the at least one slot assigned to the first communication component to avoid conflict with the transmission or reception of the first communication component.

21. The apparatus of claim 20, further comprising:

means for requesting a reassignment of the at least one slot assigned to the first communication component;

means for canceling a data packet transmission in response to the request; and means for reassigning the at least one slot to the second communication component based upon the request.

22. The apparatus of claim 20, further comprising:

means for determining a frequency hopping schedule for the first communication component; and means for filtering transmissions and receptions of the first communication component to avoid interference with the second communication component.

23. The apparatus of claim 20, further comprising:

means for monitoring radio frequency (RF) power of the first communication component; and means for determining the at least one slot assigned to the first communication component.

24. The apparatus of claim 20, further comprising:

means for monitoring traffic on a serial bus interface (SBI) connected to the first communication component; and determining the at least one slot assigned to the first communication component.

25. The apparatus of claim 20, further comprising:

means for transmitting a message from the first communication component to the second communication component, the message comprises a schedule for the at least one slot assigned to the first communication component.

26. A non-transitory computer-readable medium having stored thereon computer-executable instructions comprising:

instructions for detecting an assignment of at least one time slot for transmission or reception to a first communication component of an electronic device utilizing a first communication protocol; and instructions for controlling transmission and reception between a second communication component of the electronic device and an access point utilizing a second communication protocol by sending a control signal to the access point for coordinating access point scheduling during the at least one slot assigned to the first communication component to avoid conflict with the transmission or reception of the first communication component.

27. The non-transitory computer-readable medium of claim 26 further comprising instructions for:

requesting a reassignment of the at least one slot assigned to the first communication component; and reassigning the at least one slot to the second communication component based upon the request.

28. A mobile device that coordinates communication for multiple wireless communication protocols within the mobile device, comprising:

a first communication component of the mobile device utilizing a first communication protocol, the first communication component assigned at least one time slot for transmission or reception; and a second communication component of the mobile device utilizing a second communication protocol for communicating with an access point, the second communication component comprises a processor that controls the transmission and reception of the second communication component by sending a control signal to the access point for coordinating access point scheduling during the at least one slot assigned to the first communication component to avoid conflict with transmission or reception of the first communication component.

29. The mobile device of claim 28, the device is at least one of a cellular phone, a smartphone, a handheld communication device, a handheld computing device, a satellite radio, a global positioning system, a laptop and a PDA.

30. A non-transitory computer readable medium comprising instructions which when executed coordinate communication for multiple wireless communication protocols within an electronic device, comprising:

detecting an assignment of at least one time slot for transmission or reception to a first communication component of the electronic device utilizing a first communication protocol; and controlling transmission and reception between a second communication component of the electronic device and an access point utilizing a second communication protocol by sending a control signal to the access point for coordinating access point scheduling during the at least one slot assigned to the first communication component to avoid conflict with the transmission or reception of the first communication component.

31. The processor of claim 30, the instructions further comprising:

requesting reassignment of the at least one slot assigned to the first communication component; and reassigning the at least one slot to the second communication component based upon the request.

32. The method of claim 1, wherein the control signal indicates when the access point is permitted to send packets to the electronic device.

33. The method of claim 1, wherein the controlling utilizes an unscheduled automatic powersave delivery (UAPSD) mode in which the access point stores packets for the electronic device during a sleep period, the control signal comprising a trigger message generated when the electronic device wakes up from the sleep period to instruct the access point to send stored packets to the electronic device.

34. A method of coordinating communication for multiple wireless communication protocols within an electronic device, comprising:

detecting an assignment of at least one time slot for wireless communication at the electronic device utilizing a Bluetooth communication protocol; and controlling wireless communication between the electronic device and an access point utilizing an IEEE 802.11 communication protocol by utilizing a power saving feature of the IEEE 802.11 communication protocol during the at least one slot assigned to the Bluetooth communication protocol to avoid conflict with wireless communication according to the Bluetooth communication protocol.

35. The method of claim 34, wherein the power saving feature of the IEEE 802.11 communication protocol is an unscheduled automatic powersave delivery (UAPSD) mode in which the access point stores packets for the electronic device during a sleep period to avoid conflict during the at least one slot assigned to the Bluetooth communication protocol.

36. The method of claim 34, wherein the power saving feature of the IEEE 802.11 communication protocol is a scheduled automatic powersave delivery (APSD) mode in which the electronic device requests scheduled transmissions and receptions from the access point to avoid conflict during the at least one slot assigned to the Bluetooth communication protocol.

37. The method of claim 36, further comprising sending a trigger message to the access point when the electronic device wakes up from the sleep period to instruct the access point to send stored packets to the electronic device.

* * * * *